(12) United States Patent
Dix et al.

(10) Patent No.: US 7,706,948 B2
(45) Date of Patent: Apr. 27, 2010

(54) METHOD FOR CREATING SPIRAL SWATHS FOR IRREGULAR FIELD BOUNDARIES

(75) Inventors: Peter J. Dix, Naperville, IL (US); Kousha Moaveni-Nejad, Chicago, IL (US)

(73) Assignee: CNH America LLC, New Holland, PA (US)

( * ) Notice: Subject to any disclaimer, the term of this patent is extended or adjusted under 35 U.S.C. 154(b) by 596 days.

(21) Appl. No.: 11/681,445

(22) Filed: Mar. 2, 2007

(65) Prior Publication Data

US 2008/0215203 A1    Sep. 4, 2008

(51) Int. Cl.
    *A01B 69/00* (2006.01)
(52) U.S. Cl. .......................................... 701/50; 701/26
(58) Field of Classification Search ............... 701/50, 701/26
    See application file for complete search history.

(56) References Cited

U.S. PATENT DOCUMENTS

| 5,995,902 | A | 11/1999 | Monson |
| 6,076,025 | A * | 6/2000 | Ueno et al. ............... 701/23 |
| 6,128,574 | A | 10/2000 | Dickhans |
| 6,205,381 | B1 | 3/2001 | Motz et al. |
| 6,236,924 | B1 | 5/2001 | Motz et al. |
| 6,363,321 | B1 | 3/2002 | Fowler et al. |
| 6,463,374 | B1 | 10/2002 | Keller et al. |
| 6,501,422 | B1 * | 12/2002 | Nichols ............... 342/357.17 |
| 6,907,336 | B2 | 6/2005 | Gray et al. |
| 7,142,956 | B2 | 11/2006 | Heiniger et al. |
| 2004/0186644 | A1 | 9/2004 | McClure et al. |
| 2004/0193348 | A1 * | 9/2004 | Gray et al. .................. 701/50 |
| 2005/0197757 | A1 * | 9/2005 | Flann et al. ................. 701/50 |
| 2005/0197766 | A1 | 9/2005 | Flann et al. |
| 2006/0178825 | A1 | 8/2006 | Eglington et al. |
| 2007/0021913 | A1 * | 1/2007 | Heiniger et al. ............ 701/213 |
| 2007/0213892 | A1 * | 9/2007 | Jones et al. ................. 701/23 |
| 2007/0244610 | A1 * | 10/2007 | Ozick et al. ................. 701/23 |
| 2009/0118904 | A1 * | 5/2009 | Birnie ........................ 701/41 |

* cited by examiner

*Primary Examiner*—Thomas G Black
*Assistant Examiner*—Shelley Chen
(74) *Attorney, Agent, or Firm*—Patrick M. Sheldrake; John William Stader; Michael G. Harms

(57) ABSTRACT

A method for calculating spiral swath paths in an area with irregular boundaries and providing automatic guidance of a vehicle along the calculated spiral swath paths. A baseline swath path is generated, and at least one adjacent swath path is calculated based on the minimum turning radius of the vehicle and associated implement. An algorithm calculates the continuous spiral swath path by monitoring a position data points at the end point of the previous swath path at the starting point of the at least one adjacent swath path, configuring a radius of curvature for each individual swath path determining the radius of curvature for each swath path and joining the individual swath paths into one continuous spiral swath path.

14 Claims, 9 Drawing Sheets

METHOD FOR CREATING SPIRAL SWATHS FOR IRREGULAR FIELD BOUNDARIES

BACKGROUND OF THE INVENTION

The present invention is directed to a method for calculating spiral swath paths. More specifically, the present invention is directed to a method for calculating spiral swath paths in an area with irregular boundaries and providing automatic guidance of a vehicle along the calculated spiral swath paths.

A path planner may be used to determine one or more path plans for an agricultural vehicle to cover a work area. The work area may represent a field for growing a crop of other vegetation. The vehicle may need to traverse the entire work area or a portion thereof to plant a crop (or precursor thereto), to treat a crop (or precursor thereto), to harvest a crop, or to perform another task associated with the crop of vegetation, for example.

Agricultural vehicles commonly use manual or automatic guidance systems based on satellite positioning system such as global positioning (GPS). These systems typically allow the operator to record a base path of the vehicle and then automatically generate additional swaths parallel to this recorded swath. Often times straight-line guidance is used, or equally spaced curves along the field boundaries or constant elevation lines through the field.

Another common practice in farming is to drive a vehicle along the boundary, then as the vehicle approaches the point at which it entered the field, the vehicle is directed inward to position the vehicle parallel to the first swath path, minimizing any "skip" or "gaps" or in addition, any overlap as practical. The term skip or gaps, as used in this application, is any area left between swath paths. Skip is essentially any area that is not traversed by the vehicle and its associated implement and is therefore not included in the work area. Overlap, as used in this application, is any area or portion thereof that is covered by more than one swath path. Overlap is an area that the vehicle and its associated implement have been driven over repeatedly.

Therefore it would be a great advantage to provide a method for creating spiral swath patterns for use by a vehicle navigation system that streamlines data storage requirements to reduce demands on the storage and computational elements of the navigation system thereby reducing hardware expense of the vehicle guidance system. Further advantages would be realized if the method and apparatus for creating spiral swath patterns for use by a vehicle navigation system was capable of storing path positional data for future use, so that valuable time and energy is saved by eliminating the requirement to create a new baseline swath or provide a boundary before each use of the method. Still further advantages would be realized if the method recognized vehicle/implement limitations in following a defined path and adjusted such paths accordingly. These and other advantages are provided by the method and vehicle guidance system described below.

SUMMARY OF THE INVENTION

Accordingly, the present invention is directed to a method for creating swath paths. The method includes providing a vehicle with an associated implement, providing a vehicle guidance system with a vehicle position receiver, providing a swath generation apparatus (SGA) with a processing capability and an SGA memory device communicatively coupled to the guidance system and providing an operator input device. The method also includes the steps of communicating a set of predetermined parameters to the SGA, defining a coordinate system for vehicle position and establishing a baseline swath path configured with a starting point and an end point and defined by a plurality of position data points. Lastly, the method includes calculating with an iterative process using the predetermined parameters, a swath path disposed adjacent to the baseline swath path and defined by a plurality of position data points that is generally parallel to a previous swath path. The swath paths are spaced apart by a swath width and have a curvature slightly differing from the curvature of the previous swath path. The swath paths beginning at the end point of the previous swath path, and the interconnected swath paths form a continuous spiral swath path.

In another aspect the invention is directed to a vehicle guidance system. The system includes a vehicle with an associated implement, a vehicle guidance system with a vehicle position receiver, a swath generation apparatus (SGA) with a processing capability and an SGA memory device communicatively coupled to the guidance system and providing an operator input device. The system includes the SGA using a set of predetermined parameters, defining a coordinate system for vehicle position and establishing a baseline swath path having with a starting point and an end point. Lastly, the system includes the SGA using an iterative process and the predetermined parameters to calculate a swath path disposed adjacent to the baseline swath path and defined by a plurality of position data points that is generally parallel to a previous swath path. The swath paths are spaced apart by a swath width and have a curvature slightly differing from the curvature of the previous swath path. The swath paths beginning at the end point of the previous swath path, and the interconnected swath paths form a continuous spiral swath path.

One advantage of the present invention is that the method can be used with both the automatic and manual mode of operation of the vehicle.

Another advantage of the present invention is that the need for boundary limits is eliminated and the use of a baseline swath is used.

Yet another advantage of the present invention is that the method accounts for user-inputted factors such as the minimum turning radius and the swath width.

Still another advantage of the present invention is that the method is used for irregularly shaped work areas.

Another advantage of the present invention is that the spiral swath path can be saved and reused without the need to recreate a baseline swath.

Yet another advantage of the present invention is that a new baseline spiral swath path can be created and used if the operator chooses.

Still another advantage of the present invention is that the operator may create the baseline spiral swath path at a location away from the vehicle, during a time convenient to the operator, and implemented in the work area.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Any reference herein to the terms "left" or "right," "up" or "down," or "top" or "bottom" are used as a matter of mere convenience, and are determined by standing at the rear of the vehicle facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

The swath generation methodologies described herein may find application in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. Although the various methods will be described with particular reference to GPS satellite-based systems, it should be appreciated that the teachings are equally applicable to guidance systems using other methods to determine vehicle position.

Figure 1:
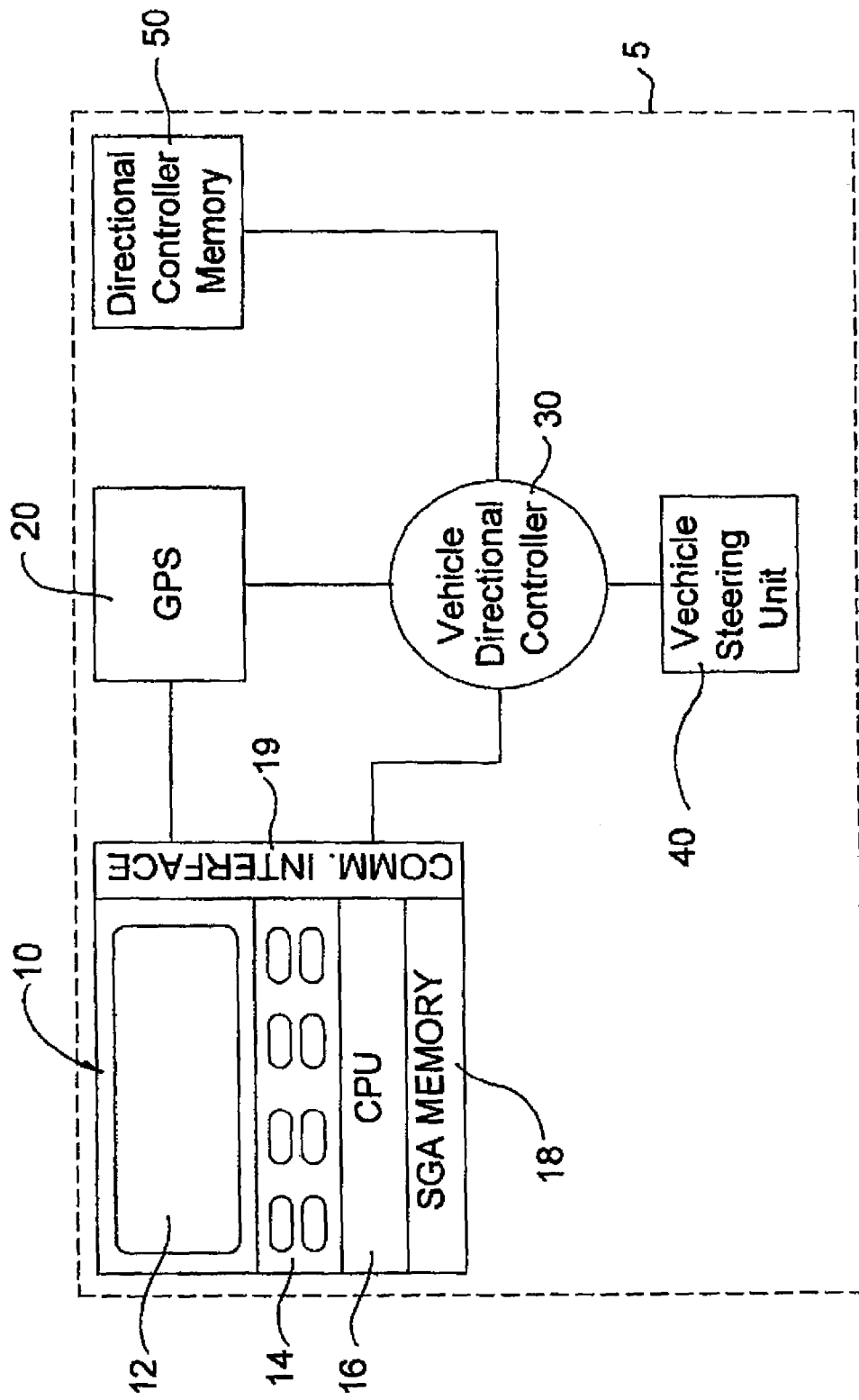
FIG. 1 illustrates a typical GPS-based vehicle guidance system.

An automatic GPS-based vehicle guidance system 5, seen schematically in FIG. 1, is of the type commonly used in agricultural and construction operations and is located on a vehicle, e.g., an agricultural vehicle or similar prime mover to simplify the task of driving the vehicle. The vehicle guidance system 5 is located on a vehicle and includes a directional controller 30, a global positioning system receiver (GPS) 20, a swath generation apparatus (SGA) 10, and a steering unit 40 communicatively coupled in a manner that enables each to send and receive data and/or control signals. The steering unit 40 preferably includes proportional and directional control valves that are hydraulically connected to a steering actuator for the vehicle. The vehicle guidance system 5 continually calculates a vehicle steering heading by comparing vehicle position and directional heading to a desired travel path provided by the SGA 10, and sends the vehicle steering heading to the steering unit 40, which in turn actuates vehicle steering (i.e., turns the wheels), thereby changing the vehicle heading. The vehicle navigation system 5 may further include other sensors, such as vehicle yaw and roll, implement hitch angle, and the like, which would also be communicatively coupled to the vehicle guidance system 5 and adjust the vehicle position signal to compensate for such vehicle movements. Though shown as discreet devices, the functions of the directional controller, swath generation apparatus, and other portions of the vehicle guidance system can easily be integrated into a single apparatus within the intent of this invention.

The directional controller 30 is typically a microprocessor-based apparatus that receives near real-time position information from the GPS 20, compares the then-current vehicle position with the intended position along a swath path (provided by the SGA 10), and directs an output signal to the vehicle steering unit 40 to cause the vehicle to be steered toward the intended position. The vehicle guidance system 5 shown is representative of numerous GPS-based vehicle guidance systems in which a SGA 10 incorporating the present invention may prove useful.

The SGA 10 is preferably mounted inside the operator compartment of the vehicle to be easily accessible to the operator. The SGA 10 preferably includes a visual display 12 and an operator input device 14 to enable the operator to interface with the vehicle guidance system 5, and a microprocessor 16, an SGA memory 18, and a communication interface 19 that allows the SGA 10 to communicate with other components of the vehicle guidance system 5. The operator input device 14, of which examples include keyboards, touchpads, joysticks, and the like, may be integrated into the visual display 12 (e.g., a touch-screen) so that task-specific "keys" can be easily provided in a compact format or modified by software changes. The SGA memory 18 preferably comprises a removable memory media for all or a portion of the total SGA memory that allows stored swath path information to be conveniently moved and shared among multiple vehicles or with other computer system (i.e., an office computer system). When removable media is utilized, the SGA memory 18 may function as yet another variation of the operator input device 14. The SGA 10 provides computational capability thereby allowing the directional controller 30 to be dedicated to the task of guiding the vehicle along a desired swath path determined by the SGA 10. The primary task of the SGA 10 is to record or recall a baseline swath, efficiently store the position data for points along the baseline swath path, generate additional, generally parallel swath paths that, in the aggregate, define a spiral swath pattern that covers the crop growing area of a field, and efficiently communicate the spiral swath path information, as needed, to the directional controller 30. The SGA 10 is also tasked with accepting operator inputs that may require changes to a baseline swath path, e.g. a change in the swath width due to a change in the implement used, and efficiently recreating a revised baseline swath path from which the remaining spiral swath paths may be created.

The SGA 10 is configured to receive information about the field or baseline swath to be processed from the operator and to selectively transmit the swath path definition information to the directional controller 30. Input information may include field information (e.g., name, location, size, etc . . . ), minimum turning radius of the vehicle and implement, the operations to be performed, the implements to be used while processing the field, and the geometry of each implement. Input information may be manually input via the operator input device 14, but is more conveniently transferred into the SGA using a removable module for the SGA memory (e.g., a portable memory card) so that the operator can select from stored information. Information can be entered into portable memory cards by numerous means, including computers, which offer greater ease and efficiency for such operations compared to performing them while seated in the vehicle ready to commencing farming operations. An alternate embodiment uses common wireless technology to transmit general input information and a baseline swath path definition to the SGA further enhancing the SGA's ability to share stored swath path information.

With basic information about a field or baseline swath having been entered, the operator may select a desired swath path from the SGA memory 18. Alternatively, the operator may choose to define and store a new baseline swath path and/or baseline swath pattern in the SGA memory. Once a baseline swath is identified or selected, the SGA 10, in accordance with its internal programming, will create a swath pattern comprising a series of additional swath paths that will, as a whole, define a series of swaths that, based on specific vehicle and implement characteristics, cover substantially all of the crop growing area of a selected field. As the vehicle is positioned at the beginning of the baseline swath path and the vehicle guidance system is engaged, information defining the desired spiral swath path is communicated by SGA 10 for use by the directional controller 30 to manage vehicle movement along the desired path. The rate of communication of swath path information may be varied so that SGA 10 provides swath path position data points at an optimal rate for the directional controller used in the vehicle guidance system.

Typically, a the term 'spiral' refers to a set of points in a plane that move around a fixed center at a monotonically increasing or decreasing distance from the center, or a three dimensional locus of a point moving parallel to and about a central axis at a constant or continuously varying distance. A spiral component or spiral swath path can have several meanings for the purpose of this application. 'Spiral' as used in this application is not limited to the typical configuration as defined above. A spiral swath path may be a path plan or contour rows that follow a generally spiral path. Next, a spiral swath path may be a path plan or contour rows that comprise a series of nested loops, e.g. concentric paths or concentric path rings. These nested loops may or may not have an irregular shape as contours in the work area or obstacles in the vehicle's path may cause the vehicle to traverse around these contours or obstacles and form an irregularly shaped loops. Also, a spiral swath path may be a path plan or contour rows having a continuous curve of variable radius that begins from an outer border and works inward, and further, a spiral swath path may be a path plan or contour rows having a continuous curve of variable radius from an inner border and works outward. The variable radius may be variable along one curve of the spiral and not just varying for each concentric ring in the spiral shape. See FIGS. 2, 8, 9 and 10 for examples of irregularly shaped loops that may be formed for this application.

Figure 2:
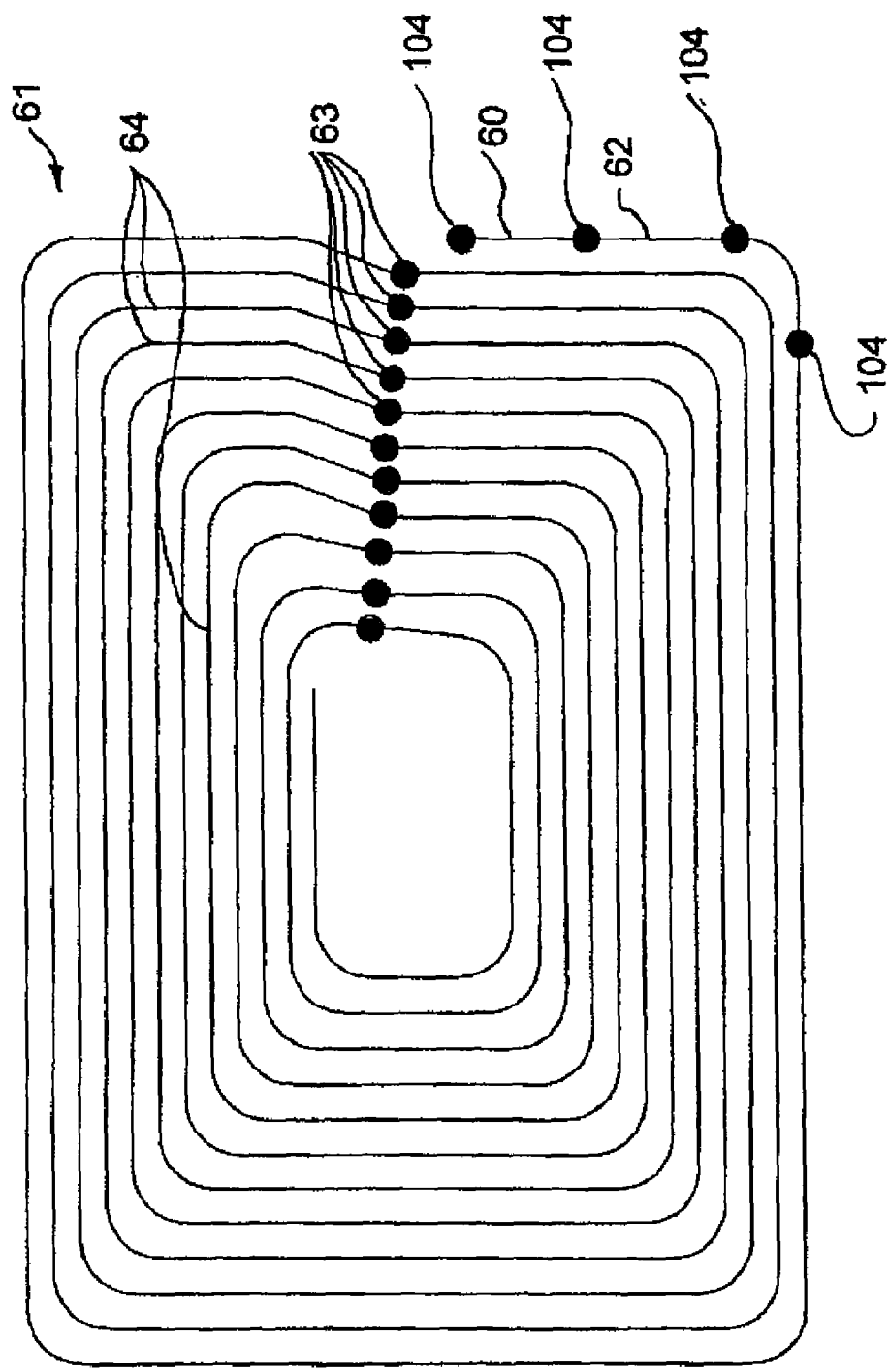
FIG. 2 illustrates one embodiment of a swath path generated by the present invention.

Referring now to FIG. 2, there is shown an example of a spiral swath arrangement in a field. A swath path 62 is created when an implement having an effective working (swath) width traverses a swath path 64 over the ground. The implement may be a single-use self-propelled unit, or may be pushed, towed, or otherwise connected to a prime mover traversing the swath path 64. Swath paths 64 are defined by a plurality of position data points 104 spanning from a beginning position 60 to an end position 63. Swath path segments 64 connect adjacent pairs of position data points 104 along each swath path 64. A spiral swath path pattern 64 is comprised of one or more swath paths arranged so that substantially all of the tillable area of a field is covered by the swath paths 64. In an agricultural application, a farmer typically processes a field by first creating a baseline swath path 62, and traversing continually inward along the remaining swath paths 64, where the end point 63 of the previous swath path becomes the starting point 60 for the next swath path. As they move through the field, the tractor and the implement will create a distinct spiral swath pattern through the field. The object is for the spiral swath pattern to cover as much of the crop planting area of the field as is practical while minimizing the portions of the area that are covered multiple times.

The initial swath path definition requires identifying positional data points, generally spaced three to ten meters apart, the first positional data point being the beginning 60 point and last positional data point being the end 63 point of the swath 62. The baseline swath path, designated as S=1, has a single swath segment 62 therebetween. Upon identification of these position data points, internal programming within the SGA 10 will generate a series of swath paths transversely spanning (i.e., generally perpendicular to the direction of vehicle travel) the defined field boundary. Each swath path may be designated as S=i where i ranges from 1 to n and n is the total number of generated swath paths needed to transversely span the field. As each straight-line swath path may be defined by only two position data points, data storage and numerical computation demands are minimal and do not impose significant demands on the SGA 10 processing and storage resources.

Since a spiral swath path contains one or more curved portions, additional actions by the SGA 10 are required since the number of position data points 104 needed to define a swath path 64 are increased. Baseline swath paths 62 may be memorized by driving a vehicle along a swath path while recording position data points along the way. Baseline swath paths may also be defined remotely (e.g., from a location other than on a vehicle) using detailed maps or by storing position information from earlier passes over a field and stored in the SGA memory 18 incorporating a removable media that allows the information to be readily used by multiple vehicles relying on the present swath generation apparatus. Upon reaching a field to perform an operation, the operator enters information identifying the field, implement, and operation to be performed via operator input device 14 of the SGA 10. If no swath path information is available from saved storage, the operator will be directed to manually drive and store information defining the first swath path, S=1, into memory. If the swath path has been previously stored, the SGA 10 recalls the baseline swath path information and proceeds with swath path generation.

The present invention also allows new swath path information to be stored in SGA memory while the SGA is engaged (automatically tracking) another swath path. For example, the starting 60 and end 63 points for a new spiral swath path could be stored to SGA memory while the vehicle is being automatically guided around the perimeter of a field. The operator may choose to engage the manual mode of operation, where the operator controls the steering of the vehicle, then return to the automatic mode of operation. The SGA continues to record this baseline swath path throughout both the automatic and manual modes of operation. The operator may choose to engage the manual mode of operation to avoid an obstacle in the vehicle's path, for example. Once the baseline swath path 62 is completed, information for a next swath path 64 bounded by the baseline swath 62 would then be available for the SGA to create a series of spiral swath paths 64 covering the area within the baseline swath. In the absence of this capability, the operator could be forced to direct the vehicle to the starting and end points of a new interior spiral swath path after completing the baseline perimeter swath, requiring additional, non-productive vehicle travel.

Each subsequently generated swath path 102S=i+1 is offset from the adjacent swath path 102S=i by the effective working width (swath) in an iterative manner resulting in an array of swath paths, each having a shape slightly different from the one from which it was generated. Once generated by the SGA, the swaths may then be communicated to and used by the vehicle navigation controller. In the present invention, each subsequent swath path (S=i+1) is offset from the swath path immediately adjacent thereto (S=i) using a spiral offset method. By calculating the offset from the adjacent swath path, minor swath path adjustments that an operator may introduce will be carried through to the subsequently created spiral swath paths. This approach also causes the curvature of each path to differ slightly from the adjacent path from with it was created, especially in areas where the radius of curvature equals the minimum turning radius of the vehicle and its associated implement. Changes in shape from one swath path to the next occur as the radius of curvature is increased or decreased to maintain the edges of the swath close together. Cases in which the radius of curvature is decreasing from one swath path to the next may eventually reach the minimum turning radius limit of the vehicle and associated implement. When this limit is reached, the subsequent swath path curvature will have a different shape than the swath path from which it was generated and there will be gaps between adjacent swaths in the area of minimal radius curvature.

Figure 3:
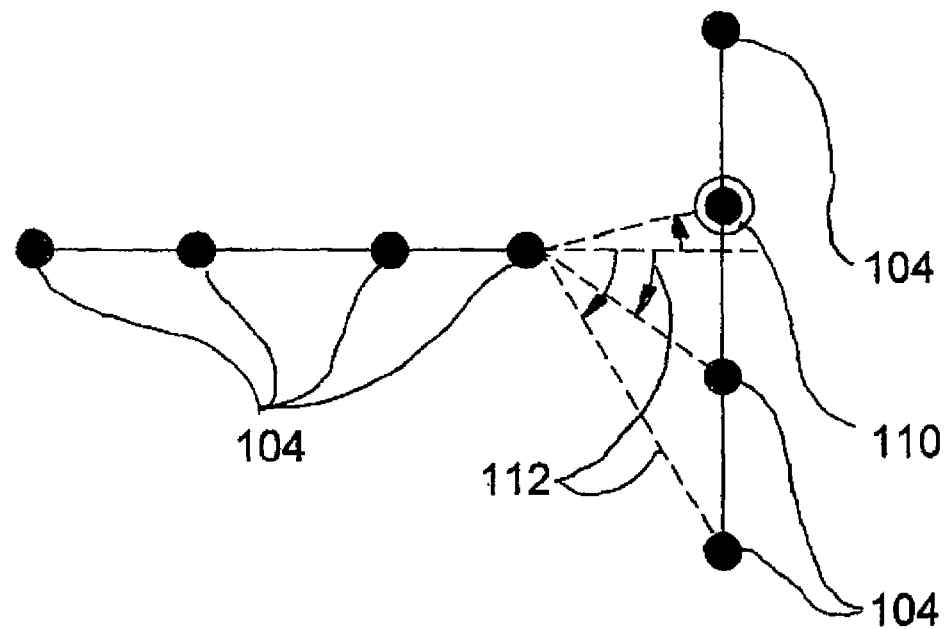
FIG. 3 illustrates the trimming process of one embodiment of the present invention.
Figure 4:
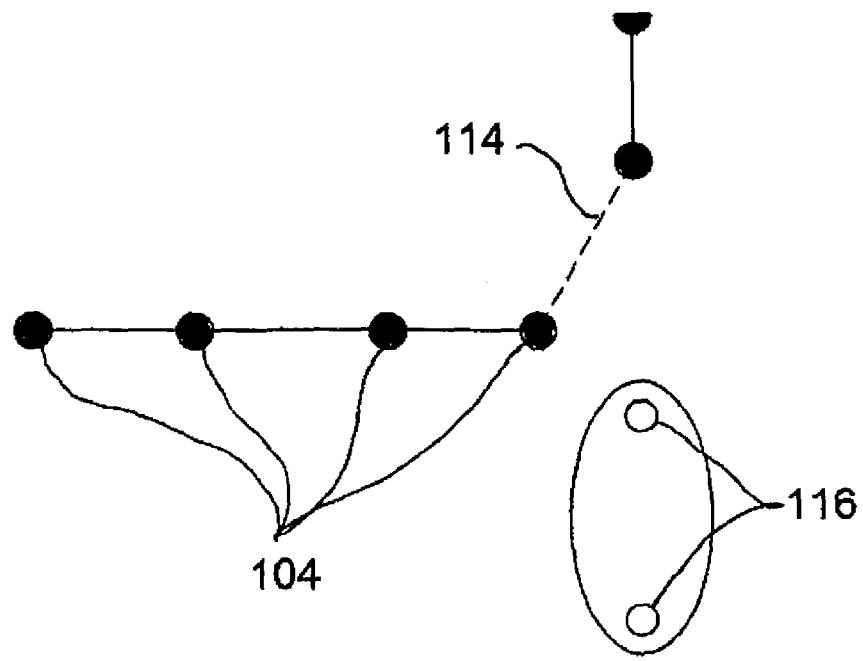
FIG. 4 illustrates a resultant path from the trimming process in FIG. 3.
Figure 11:
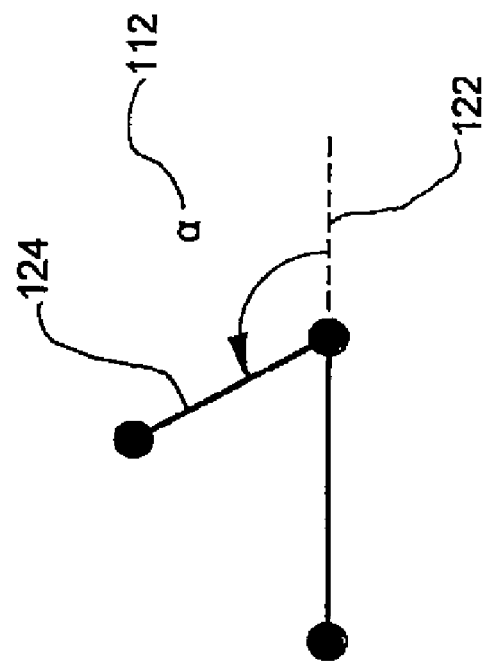
FIG. 11 illustrates the rotation angle of the swath path generated by the present invention.

FIGS. 3-6 show the trimming and joining process of calculating the remaining swath paths from the baseline swath path. Trimming, in this specification, refers to the process of adjusting the adjacent spiral swath path to minimize gaps or overlaps between the previous swath path and to provide a realistic radius of curvature for the vehicle to travel. Joining, in this specification, refers to the process of joining the end points of adjacent spiral swath paths to eliminate gaps or overlap and to provide a smooth transition for the vehicle to travel between each swath path. As shown in FIG. 3, the position data points 104 are generated along each swath path. A selected point 110 at the end of the adjacent swath path is chosen and the rotation angles 112 are checked for an increase in the angle magnitude. As referred to in this specification and as shown in FIG. 11, the rotation angle 112 is the angle between the extension 122 of the last segment of one swath path, and the line segment 124 that joins that one swath path to the next adjacent swath path. In other words, the rotation angle 112 is the angle that the vehicle should turn. Referring now to FIG. 4, if the rotation angles 112 indicate an increase in the magnitude of the angle, then remaining points 116 are deleted. The vehicle then follows the resultant path 114.

Figure 5:
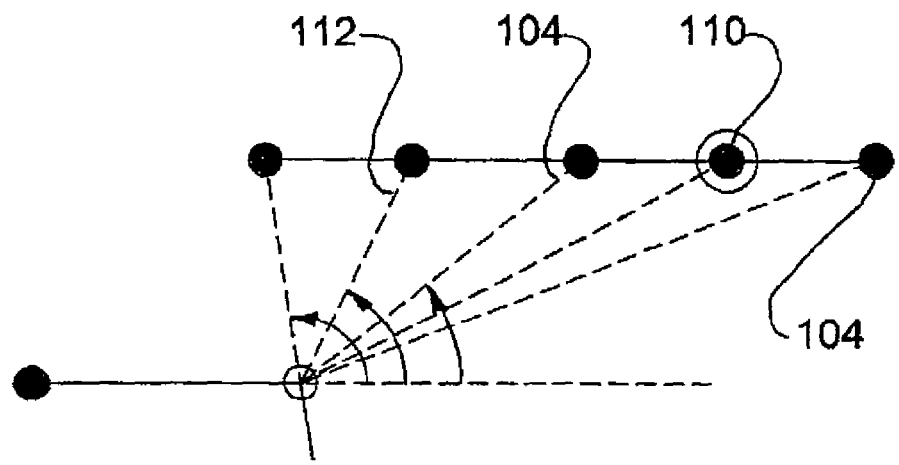
FIG. 5 illustrates the trimming process of one embodiment of the present invention.
Figure 6:
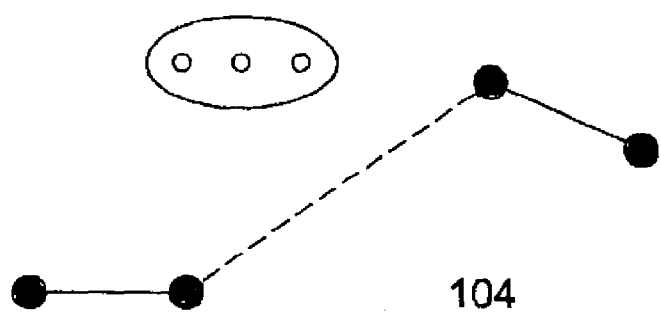
FIG. 6 illustrates a resultant path from the trimming process in FIG. 5.

FIG. 5 illustrates that the angle 112 does not change directions, so no points 104 are deleted. However, the next step is to check the distance of the points 104. The distance allows the system to create smooth transitions between the points 104. If the distance is larger than the swath width, the remaining points 116 are deleted as shown in FIG. 6. The vehicle follows the resultant path 114. The points 104 are then interpolated to maintain predetermined spacing between each point 104. The predetermined spacing is at least longer than one swath width, i.e. the swath width may be, but is not limited to, three times the swath width. The vehicle follows the resultant path 114. The points 104 are then interpolated to maintain a three to ten meter spacing between each point 104. The goal of the present invention is to avoid a curve with more than a ninety-degree change in direction between the points 104. The radius of curvature correction is then applied to make an easily navigational arc.

Figure 7:
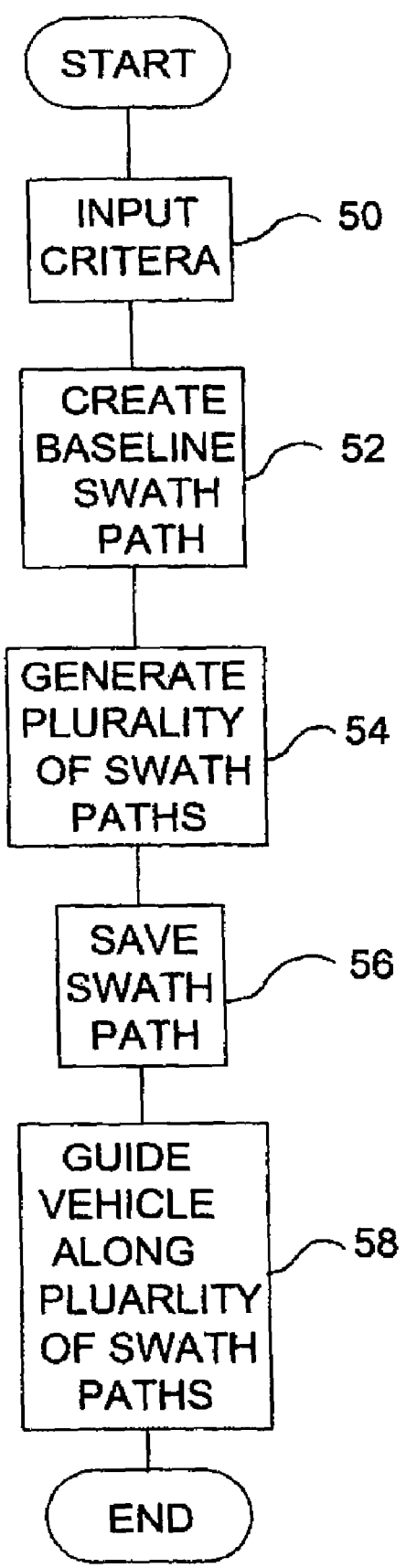
FIG. 7 is a flow chart illustrating the swath planning process of the present invention.

FIG. 7 illustrates the process in which the spiral swath path is generated. In step 50, the operator inputs several criteria that are required for the algorithm that is used to calculate the spiral swath path. The criteria may include, but is not limited to the desired swath width, e.g. the width of the implement used, and the minimum turning radius of the vehicle. Next, in step 52 the baseline swath path is created. The baseline swath path can be created in several different methods. First, the baseline swath path may be driven by the vehicle and saved as the vehicle travels the desired path. Next, the baseline swath path may be recalled from an earlier saved swath path. In addition, the baseline swath path may have been created on a computer system at a location such as a home or office on a device such as a personal computer. The operator may input the path desired and save it, then recall it once the operator is prepared to use it with the vehicle. The baseline swath path is defined in the SGA by a series of data points spaced between 3 and 10 meters apart. A starting point and ending point of the baseline swath path is generated by the SGA and stored. If the baseline swath path is created by the vehicle traveling along the baseline swath path and the SGA storing the path, the operator may choose to initiate the implement to perform work, or choose to travel the baseline swath path without performing work. This eliminates the issue of the operator having to waste time and energy simply creating a baseline swath path. The operator may initiate work during the creation of the baseline swath path to engage in a more efficient process. The baseline swath path may create a border in which the remaining swath paths are surrounded (See FIG. 8-10). However, the operator may also choose to create the baseline swath path in the center where the remaining swath paths are created to the outside region of the baseline swath path. Further, the remaining swath paths may not reach into the center of the work area. It is not essential to the present invention that the swath paths are generated to cover the entire area if the operator chooses.

Once the baseline swath path is created in step 52, the SGA generates the remainder of the spiral swath path in step 54. The remainder of the spiral swath paths are generated by an algorithm that takes into account at least the stored starting and end points of the baseline swath path, the operator inputted criteria, and the radius of curvature. Other factors may also be included in the algorithm. The radius of curvature is limited continually along the each of the spiral swath paths, even during transition from one swath path to the next. In addition, the radius of curvature is continually limited along the spiral, even during the transition from one swath to the next. Once the spiral swath path is created in step 54, the swath path is saved in step 56. The vehicle is then guided along the spiral swath path that is created in step 58. The vehicle is guided in either the automatic or manual mode of operation, however, the purpose of the method of the present invention is preferably to provide a more convenient and efficient method for the operator to travel along a spiral swath path in the automatic mode of operation.

Once the spiral swath path is stored in the SGA, it may be reused repeatedly, where the exact spiral swath path is followed and the vehicle is guided along the exact same path. The operator may then engage in controlled traffic, a term known to those of ordinary skill in the art as being the practice of maintaining the vehicle along the same path to ensure that the same portion of the ground is compacted by the vehicle tires. When the spiral swath path is recalled, the program does not consider where the vehicle is currently located. The SGA will guide the vehicle from the same starting point regardless of where the vehicle is and will not recalculate based on the vehicle's actual starting point. By starting the vehicle at the same starting point each time, the vehicle travels the identical path each time the path is recalled and used. For example, the operator may complete only a portion of the work area, and return at a later time to complete the area. By recalling the identical spiral swath pattern at the identical starting point regardless of the actual starting point of the vehicle, the operator is traveling on the same path that was generated and followed for the first portion of the field.

Figure 8:
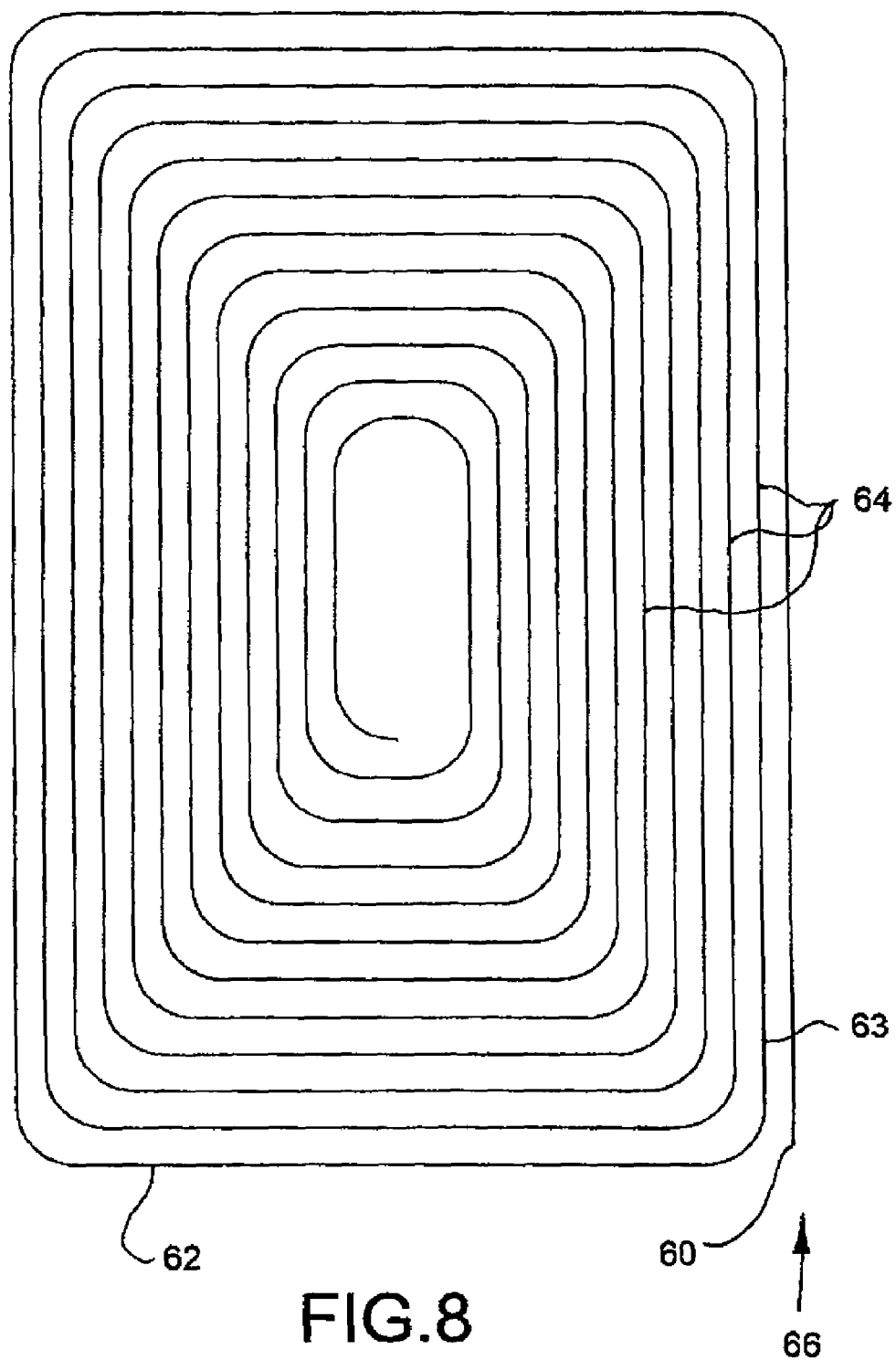
FIG. 8 illustrates one embodiment of a swath path generated by the present invention.
Figure 9:
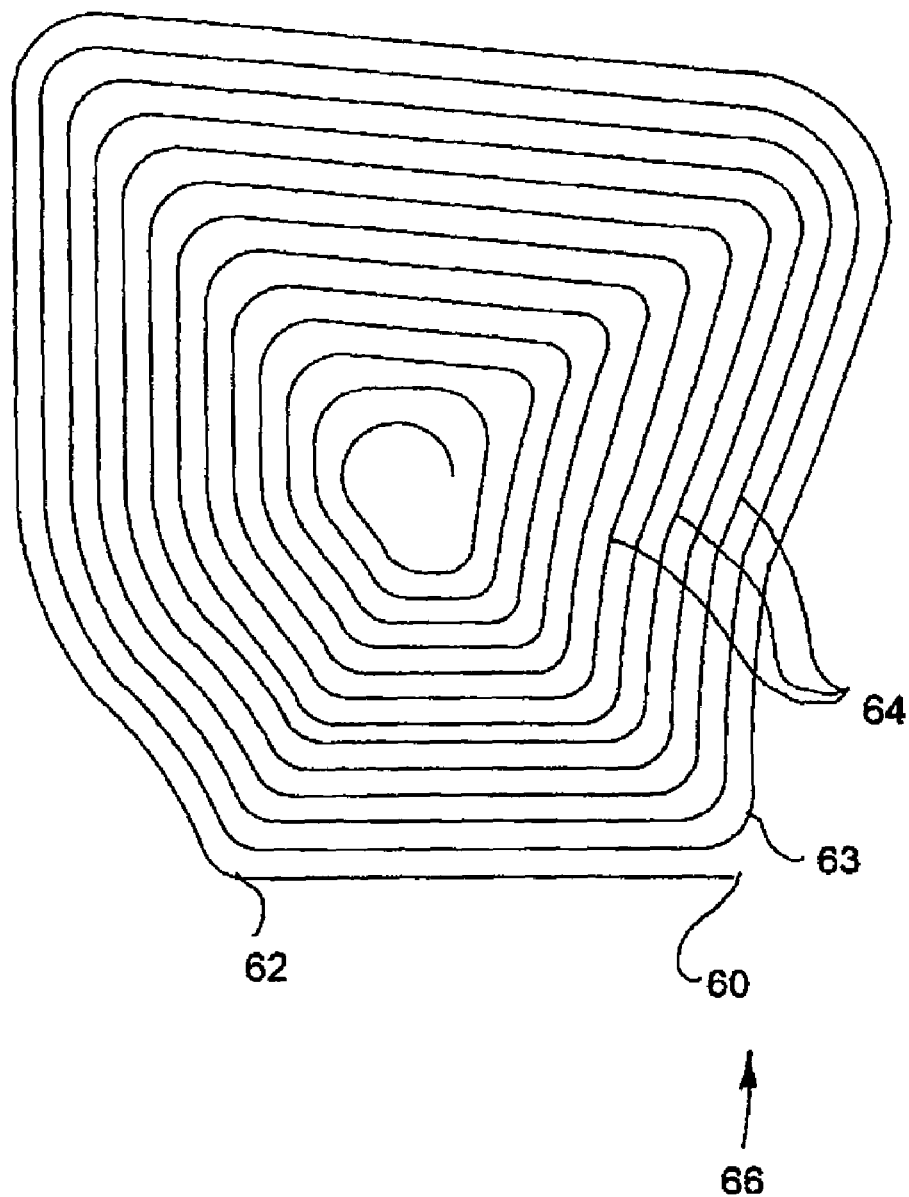
FIG. 9 illustrates another embodiment of a swath path generated by the present invention.
Figure 10:
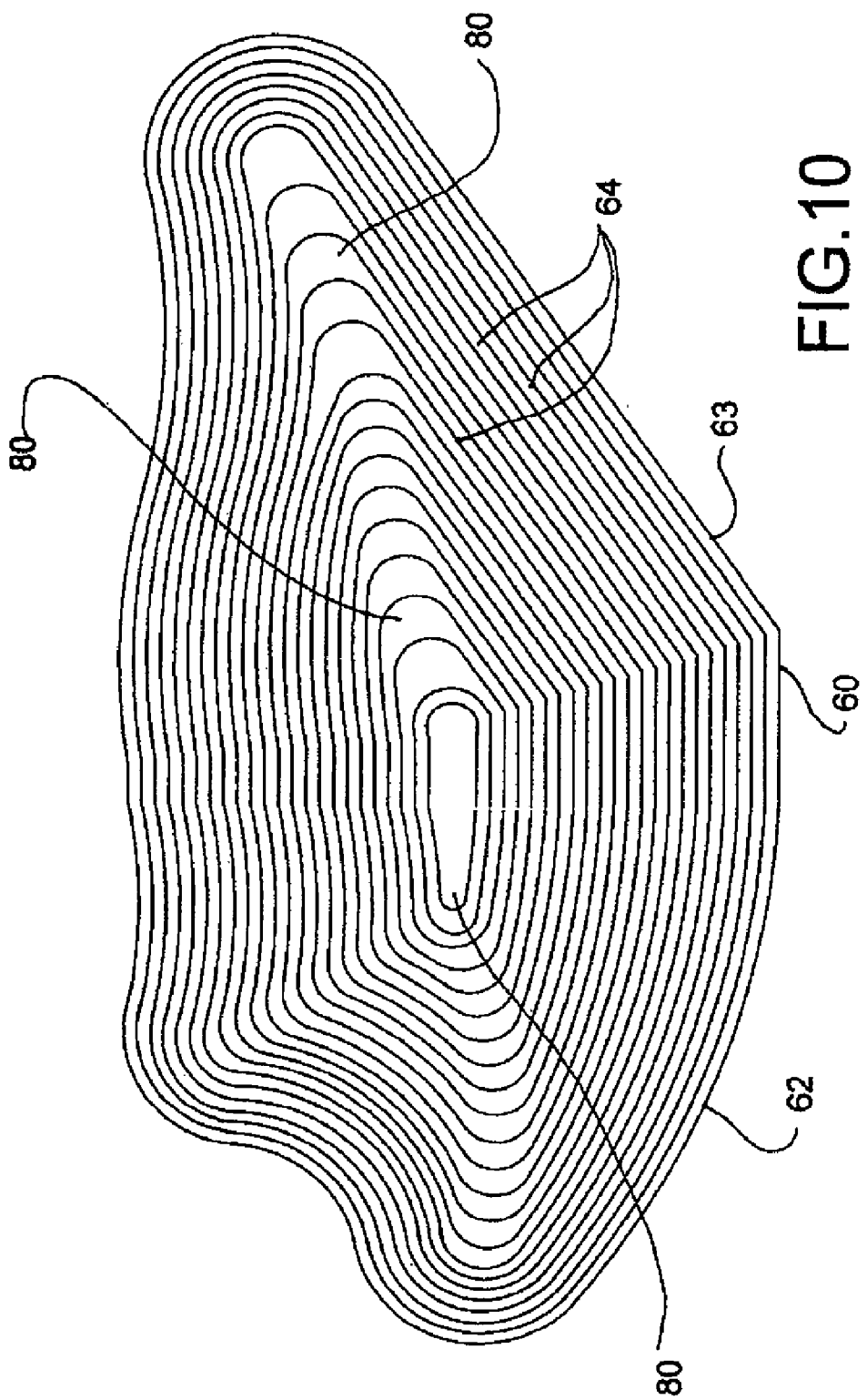
FIG. 10 illustrates yet another embodiment of a swath path generated by the present invention.

The baseline swath path that is used by the operator, whether created in the field, recalled from a saved path, or created at an alternate location such as a home computer, may follow an infinite number of paths creating an infinite number of spiral swath path shapes. Several embodiments of the present invention may include, but are not limited to spiral swath path shapes as shown in FIGS. 8, 9 and 10. FIG. 8 illustrates an example of a spiral swath path where the starting point 60 for the baseline swath path 62 is in the corner 66 of the work area 61. FIG. 9 illustrates another example of a possible spiral swath path pattern that can be used with the present invention. The starting point 60 is in the corner of the work area 61, and the baseline swath path 62 has an irregular pattern.

FIG. 10 illustrates an embodiment of a spiral swath path having an irregular shape. The irregular shape of this path may be due to irregularities in the work area e.g., hills or valleys in a field, trees or other obstacles that must be navigated around, or other causes for a non linear path. This swath path has skips or gaps 80, which are created due to the minimum turning radius considered by the algorithm when generating the swath paths 64 from the baseline swath path 62. The minimum turning radius prevents the vehicle from making sharp turns that would substantially eliminate or reduce the gaps 80. Therefore, the SGA generates a swath path that is possible for the vehicle to travel without errors or malfunction. While the gaps 80 are not preferred, it is more efficient for the vehicle to travel automatically along a path that allows for minimal gaps 80, rather than creating a path that would be impossible for the vehicle to travel.

Regardless of the shape of the swath path created by the operator, the vehicle travels along the baseline swath path 60 and the SGA records the path. While the vehicle is traveling along the path 60, the operator may choose to engage work with the implement, or choose to keep the implement disengaged. Work may include, but is not limited to planting a crop (or precursor thereto), treating a crop (or precursor thereto), harvesting a crop, or performing another task associated with the crop of vegetation. Once the baseline path 60 is completed, the end point 63 is also recorded by the SGA. An algorithm is used to calculate the remaining swaths 64 in the spiral pattern. The algorithm adjusts the remaining swath paths 64 to connect with the end point 63 of the baseline path 60 so that a smooth transition is made from the baseline swath path 60 to the next swath path pass. The minimum turning radius, or radius of curvature and also the swath width, which is primarily dictated by the width of the implement used, is considered and calculated in the algorithm that determines the path for the remaining swath path passes 64 in the spiral path.

Figure 12:
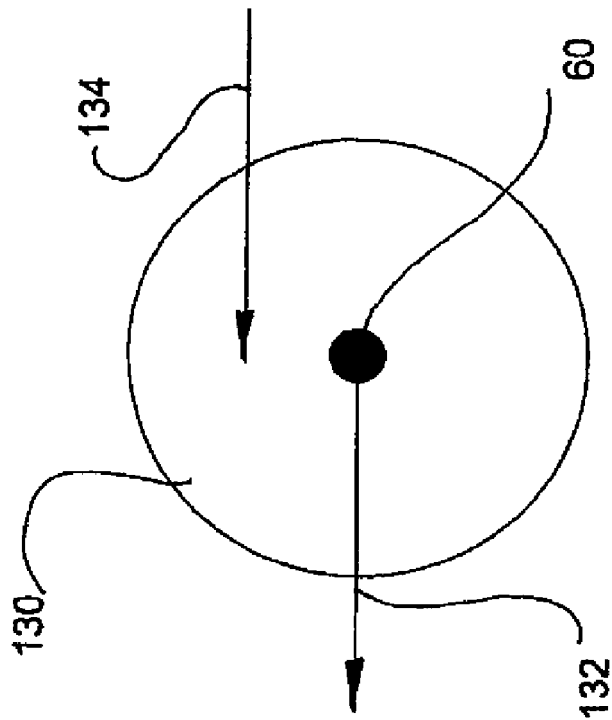
FIG. 12 illustrates the starting and end point of the swath paths used for the trimming and joining process of the present invention.

In addition, when creating the baseline swath path with the use of the vehicle, the algorithm used to calculate the spiral swath paths may automatically end without the vehicle coming to a complete stop or the operator indicating that the swath path has reached an end point. The starting point is saved once the vehicle begins to traverse the baseline swath path. Once the vehicle comes within the proximity of the starting point again, the SGA stops recording the baseline swath and the algorithm is implemented to generate the remaining swath paths. FIG. 12 illustrates the vehicle leaving and entering the area 130, which triggers the SGA's recording of the baseline swath path. The starting point 60 is the center of a predetermined area 130. This predetermined area 130 is surrounds the starting point 60. The vehicle travels away from the starting point 60, indicated in the figure as path 132. To complete the baseline swath path, the operator directs the vehicle around the desired swath path and returns to a point near the starting point 60. As the vehicle enters the predetermined area 130 near the starting point 60 as shown by path 134, the SGA monitors the location of the vehicle. The SGA monitors the vehicle's location as the distance between the vehicle and starting point reduces, then begins to increase as the vehicle passes the starting point 60. Once the SGA monitors the vehicle's distance increases again, the SGA stops recording the baseline swath path and the algorithm begins to calculate the next adjacent swath path.

The use of the minimum turning radius of the vehicle is essential to the algorithm used for the present invention to ensure that the vehicle is not required to make a turn that is too sharp and impossible to follow. Without taking into consideration the minimum turning radius, there could be a gap or skip between one swath and the next swath path generated, and there could possibly be rough transitions between each swath path's starting and end points, making it difficult for the vehicle to travel along the generated path. The algorithm minimizes or substantially eliminates the formation of gaps between the swath paths to ensure that none of the work area is left untouched by the vehicle or implement. In addition to minimizing and substantially eliminating skips or gaps, the algorithm allows for the next swath path to line up with the end point of the preceding swath path to create a smooth transition from one swath path to the next. This allows the vehicle to travel along a smooth path, while covering the maximum work area.

The present invention also has the capability to modify a spiral swath path if the operator changes either the implement or the implement width, which changes the swath width. Using the same baseline swath path, the algorithm applies the new swath width entered by the operator to generate a modified spiral swath path. This modified spiral swath path can also be saved in the SGA to be used at another time.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for creating swath paths comprising the following steps:
   providing a vehicle with an associated implement;
   providing a vehicle guidance system having a vehicle position receiver;
   providing a swath generation apparatus (SGA) having a processing capability and an SGA memory device, the SGA being communicatively coupled to the guidance system;
   providing an operator input device;

communicating a set of predetermined parameters to the SGA;

defining within the SGA a coordinate system for vehicle position;

establishing a baseline swath path for the SGA, the baseline swath path being configured with a starting point and an end point and defined by a plurality of position data points; and calculating, by the processing capability of the SGA by an iterative process using the predetermined parameters, at least one swath path adjacent to the baseline swath path and defined by a plurality of position data points generally parallel to a previous swath path of the baseline swath path or at least one adjacent swath path and spaced apart from the previous swath path by a swath width, the at least one adjacent swath path having a curvature slightly differing from the curvature of the previous swath path and the at least one adjacent swath path beginning at an end point of the previous swath path wherein the interconnected swath paths form a continuous spiral swath path; wherein the step of calculating by an iterative process using the predetermined parameters further comprises:

monitoring at plurality of adjacent position data points adjacent the end point of the previous swath path and a plurality of adjacent position data points adjacent the starting point of the at least one adjacent swath path;

determining within the SGA a radius of curvature for each series of the plurality of adjacent position data points in the previous swath path;

comparing within the SGA the radius of curvature for each series of the plurality of adjacent position data points to the minimum turning radius; and adjusting one or more of the plurality of adjacent position data points for which the radius of curvature is substantially less than the minimum turning radius so that curvature in the previous swath path has a radius of curvature equal to or greater than the minimum turning radius.

2. The method of claim 1 wherein the predetermined parameters include at least a minimum turning radius for the vehicle and associated implement.

3. The method of claim 1 further comprising the step of providing an option to manually or automatically guide the vehicle along the calculated plurality of swath paths, and disengaging the control signal to the steering mechanism of the vehicle in response to selecting the option to manually guide the vehicle.

4. The method of claim 1 wherein the step of establishing a baseline swath path for the SGA further comprises establishing a baseline swath path for the SGA by at least one of storing a traveled swath path of the vehicle, recalling a saved swath path, and creating a swath path at a remote location.

5. The method of claim 4 wherein creating a swath path at a remote location further comprises generating a baseline swath path on a personal computer.

6. The method of claim 1 wherein the position data points are spaced apart a minimum distance of 3 meters apart and a maximum distance of 10 meters apart.

7. The method of claim 1 wherein the spiral swath path comprises a baseline swath path and one adjacent swath path.

8. A system for vehicle guidance comprising:
a vehicle with an associated implement;
a vehicle position receiver;
a swath generation apparatus (SGA) having a processing capability and an SGA memory device, the SGA being communicatively coupled to the guidance system;
an operator input device being configured to receive a set of predetermined parameters for the SGA to define a coordinate system for vehicle position; and wherein the SGA calculates, by the processing capability of the SGA by an iterative process using the predetermined parameters, at least one swath path adjacent to the baseline swath path and defined by a plurality of position data points generally parallel to a previous swath path of the baseline swath path or at least one adjacent swath path and spaced apart from the previous swath path by a swath width, the at least one adjacent swath path having a curvature slightly differing from the curvature of the previous swath path and the at least one adjacent swath path beginning at an end point of the previous swath path wherein the interconnected swath paths form a continuous spiral swath path; wherein the SGA monitors a plurality of adjacent position data points adjacent the end point of the previous swath path and a plurality of adjacent position data points adjacent the starting point of the at least one adjacent swath path;

the SGA determines a radius of curvature for each series of the plurality of adjacent position data points in the previous swath path;

the SGA compares the radius of curvature for each series of the plurality of adjacent position data points to the minimum turning radius; and the one or more of the plurality of adjacent position data points are adjusted for which the radius of curvature is substantially less than the minimum turning radius so that curvature in the previous swath path has a radius of curvature equal to or greater than the minimum turning radius.

9. The system of claim 8 wherein the predetermined parameters include at least a minimum turning radius for the vehicle and associated implement.

10. The system of claim 8 further comprising the SGA providing an option to manually guide the vehicle along the calculated plurality of swath paths, and when chosen by the operator, disengages the control signal to the steering mechanism of the vehicle.

11. The system of claim 8 wherein establishing the baseline swath path for the SGA further comprises establishing a baseline swath path for the SGA by at least one of storing a traveled swath path of the vehicle, recalling a saved swath path, and creating a swath path at a remote location.

12. The system of claim 11 wherein creating the baseline swath path at a remote location further comprises generating a baseline swath path on a personal computer.

13. The system of claim 8 wherein the position data points are spaced apart a minimum distance of about 3 meters and a maximum distance of 10 meters.

14. The system of claim 8 wherein the spiral swath path comprises a baseline swath path and one adjacent swath path.

* * * * *